US009165224B2

(12) United States Patent
Mori

(10) Patent No.: US 9,165,224 B2
(45) Date of Patent: Oct. 20, 2015

(54) IMAGE FORMING APPARATUS THAT STARTS FEEDING SHEET UPON DETECTING AN IMAGE

(71) Applicant: BROTHER KOGYO KABUSHIKI KAISHA, Nagoya-shi, Aichi-ken (JP)

(72) Inventor: Kosuke Mori, Handa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/307,690

(22) Filed: Jun. 18, 2014

(65) Prior Publication Data

US 2015/0022835 A1 Jan. 22, 2015

(30) Foreign Application Priority Data

Jul. 17, 2013 (JP) ................................ 2013-148574

(51) Int. Cl.
*H04N 1/04* (2006.01)
*G06K 15/16* (2006.01)
*H04N 1/23* (2006.01)
*H04N 1/00* (2006.01)

(52) U.S. Cl.
CPC ............ *G06K 15/16* (2013.01); *H04N 1/00933* (2013.01); *H04N 1/233* (2013.01); *H04N 1/00694* (2013.01); *H04N 1/00705* (2013.01); *H04N 1/00732* (2013.01); *H04N 1/00782* (2013.01); *H04N 2201/0091* (2013.01); *H04N 2201/329* (2013.01); *H04N 2201/3287* (2013.01)

(58) Field of Classification Search
CPC .... G06K 15/16; H04N 1/233; H04N 1/00933
See application file for complete search history.

(56) References Cited

U.S. PATENT DOCUMENTS

| 5,550,614 | A | * | 8/1996 | Motoyama ....................... 399/18 |
| 5,895,928 | A | * | 4/1999 | Kerschner ................ 250/559.37 |
| 2002/0122189 | A1 | * | 9/2002 | Salgado ......................... 358/1.6 |
| 2005/0157335 | A1 | * | 7/2005 | Kuga et al. ................... 358/1.15 |
| 2011/0194135 | A1 | * | 8/2011 | Hamilton et al. ............ 358/1.14 |
| 2012/0170082 | A1 | * | 7/2012 | Labois et al. ................. 358/474 |

FOREIGN PATENT DOCUMENTS

| JP | H08-307622 A | 11/1996 |
| JP | 2002-116665 A | 4/2002 |
| JP | 2004-248326 A | 9/2004 |

* cited by examiner

*Primary Examiner* — Benny Q Tieu
*Assistant Examiner* — Michael Y Tzeng
(74) *Attorney, Agent, or Firm* — Banner & Witcoff, Ltd.

(57) ABSTRACT

An image forming apparatus may include a scanner configured to read a document, a feeder configured to feed a sheet, a printer configured to print an image on the sheet, a processor, and memory storing instructions. The instructions, when executed by the processor, may cause the image forming apparatus to control the scanner to read the document to generate read data, determine whether the read data provides an image while the scanner is reading the document, and control the feeder to start feeding the sheet to the printer in response to determining that the read data provides the image. Determining whether the read data provides the image may include determining whether a substantially blank sheet would be printed based on the read data.

19 Claims, 10 Drawing Sheets

IMAGE FORMING APPARATUS THAT STARTS FEEDING SHEET UPON DETECTING AN IMAGE

CROSS-REFERENCE TO RELATED APPLICATION

This application claims priority from Japanese Patent Application No. 2013-148574 filed on Jul. 17, 2013, the content of which is incorporated herein by reference in its entirety.

BACKGROUND

1. Field of Art

The disclosure relates to an image forming apparatus having a copy function. More specifically, the disclosure relates to the image forming apparatus capable of performing a direct copying in which printing may be started without waiting for the completion of a sheet reading for one page.

2. Description of Related Art

Known copying techniques include a memory copying technique and a direct copying technique. In the memory copying technique, printing is started on the condition that read data of a sheet for one page has been stored in a memory. In the direct copying technique, printing is started without waiting for the completion of a sheet reading for one page. The memory copying technique may have an advantage in processing, e.g., multiple copy production, scaling changes, and multiple page arrangement per sheet. The direct copying technique may have an advantage to obtain a copy output earlier.

In the known direct copying techniques, printing is started without waiting for the completion of a sheet reading for one page, and therefore, when read data does not contain any effective image, a blank sheet is output even when such output is unnecessary.

SUMMARY

The disclosure relates to an image forming apparatus configured to perform a direct copying technique in which unnecessary blank sheet outputs may be reduced.

According to one aspect of the disclosure, an image forming apparatus may comprise a scanner configured to read a document, a feeder configured to feed a sheet, a printer configured to print an image on the sheet, at least one processor, and memory storing instructions. The instructions, when executed by a processor, may cause the image forming apparatus to control the scanner to read the document to generate read data, determine whether the read data provides an image while the scanner is reading the document, and control the feeder to start feeding the sheet to the printer in response to determining that the read data provides the image.

The instructions, when executed, may cause the image forming apparatus to determine whether the read data provides the image by determining whether a substantially blank sheet would be printed based on the read data. Or, more specifically, the instructions, when executed, may cause the image forming apparatus to determine that the read data provides the image if the read data represents a predetermined number of pixels or greater each having a level of darkness that exceeds a predetermined threshold.

As disclosed herein, the image forming apparatus may be configured to determine whether the read data contains an image at a predetermined timing during a time after the reading of the document is started and before the reading is finished. The predetermined timing may be a timing, for example, at which a few lines or a half page of a document is read. The image forming apparatus disclosed herein may be configured to control the feeder to start feeding the sheet to the printer in response to determining that the data contains an image. However, the image forming apparatus might not start feeding the sheet in response to determining that the data does not contain the image.

Further, in an illustrative image forming apparatus, the presence or absence of the image in the read data may be determined at a predetermined timing before the reading is finished. The start of a sheet feeding to the printer may be determined in response to determining that the data contains an image. Since the image forming apparatus may wait to determine that read data contains an image before feeding a sheet for printing, the image forming apparatus may reduce the occurrence of a blank sheet being output.

Another aspect of the disclosure includes a method for copying a document. The method may include reading a document to generate read data, determining, by a controller, whether the read data provides an image while reading the document, and initiating feeding of a sheet to a printer to print the image in response to determining that the read data provides the image.

Yet another aspect of the disclosure includes one or more non-transitory computer-readable media storing computer-executable instructions. The instructions, when executed by at least one processor, may cause an apparatus to control a scanner to read a document to generate read data, determine whether the read data provides an image while the document is being read, and initiate feeding of a sheet to a printer to print the image in response to determining that the read data provides the image. Further, the instructions, when executed by the at least one processor, may cause the apparatus to repeatedly determine whether the read data provides an image as long as the document is being read but until determining that the read data provides an image.

According to one aspect of the disclosure, an image forming apparatus that may be capable of performing a direct copying operation and capable of reducing or preventing the output of unnecessary blank sheets may be realized.

This summary is not intended to identify critical or essential features of the disclosure, but instead merely summarizes certain features and variations thereof. Other objects, features, and advantages will be apparent to persons of ordinary skill in the art from the following detailed description of the disclosure and the accompanying drawings.

BRIEF DESCRIPTION OF THE DRAWINGS

Aspects of the disclosure are illustrated by way of example and not by limitation in the accompanying figures in which like reference characters indicate similar elements.

DETAILED DESCRIPTION OF ILLUSTRATIVE EMBODIMENTS

Figure 1:
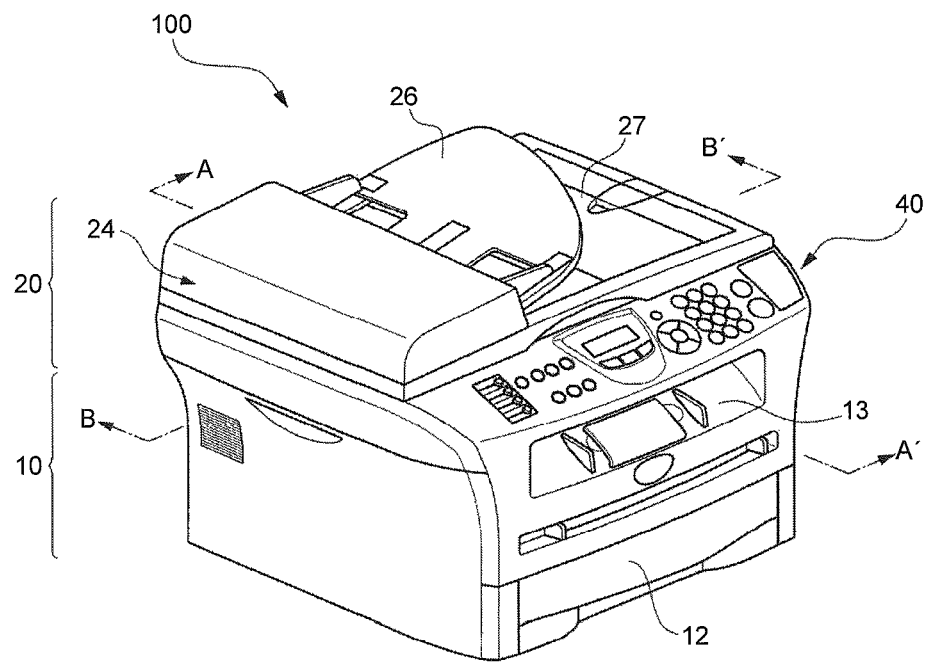
FIG. 1 is a perspective view of a multi-function peripheral device (MFP) in an illustrative embodiment according to one or more aspects of the disclosure.

For a more complete understanding of the disclosure, needs satisfied thereby, and objects, features, and advantages thereof, reference now is made to the following descriptions taken in connection with the accompanying drawings. Illustrative embodiments are described in detail herein with reference to the accompanying drawings, in which like reference numerals are used for like corresponding parts in the various drawings.

Aspects of the disclosure may be applied to an image forming apparatus, e.g., a multi-function peripheral device (MFP) 100, comprising an image reading function and an image forming function.

As shown in FIG. 1, the MFP 100 may comprise an image forming assembly 10 (or an image forming unit) configured to print an image on a sheet, an image reading assembly 20 (or an image reading unit) configured to read an image on a document, and a control panel 40 configured to display an operational status and to receive user's inputs. The image forming unit 10 may be an example of a printer. The image reading unit 20 may be an example of a reader. The control panel 40 or a part thereof (e.g., buttons, display, etc.) may be an example of a notifier.

The image forming unit 10 may be configured to form a toner image and to print the toner image to a sheet. As shown in FIG. 1, the MFP 100 may comprise a sheet supply tray 12 and an output tray 13. The sheet supply tray 12 may be configured to be attached to or removed from a lower portion of the image forming unit 10. The sheet supply tray 12 may be configured to accommodate sheets to be used for printing. The output tray 13 may be disposed at an upper portion of the image forming unit 10 and have an open end. A printed sheet may be output or discharged to the output tray 13.

Figure 3:
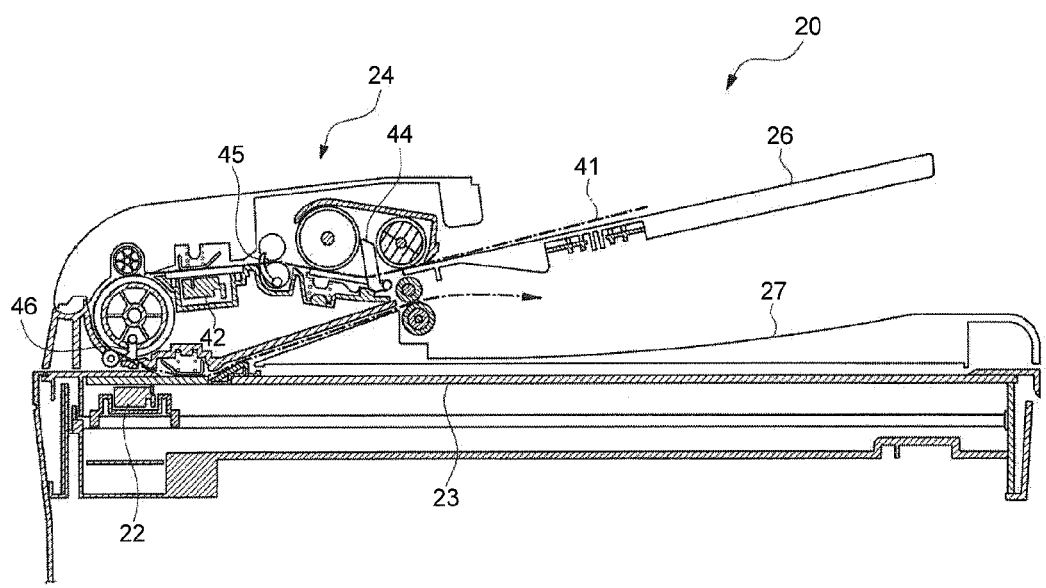
FIG. 3 is a sectional view of an illustrative image reading unit of the MFP.

The image reading unit 20 may be configured to read an image on a document while moving the document relative to a reading device (e.g., an image sensor 22 in FIG. 3). The image reading unit 20 may comprise an automatic document feeder (ADF) 24 configured to feed the document, as shown in FIG. 1. The ADF 24 may comprise a document tray 26 and a discharge tray 27. The ADF 24 may be configured to feed a document placed on the document tray 26, and discharge the document to the discharge tray 27 after the reading device reads an image on the document.

The control panel 40 may comprise buttons and a display and may be configured to receive instructions or inputs from a user. The buttons may comprise various keys, for example, a start key, a stop key, and numeral keys. The buttons may be configured to receive instructions from a user. The display may comprise, for example, a liquid crystal display, and configured to display messages to a user.

Figure 2:
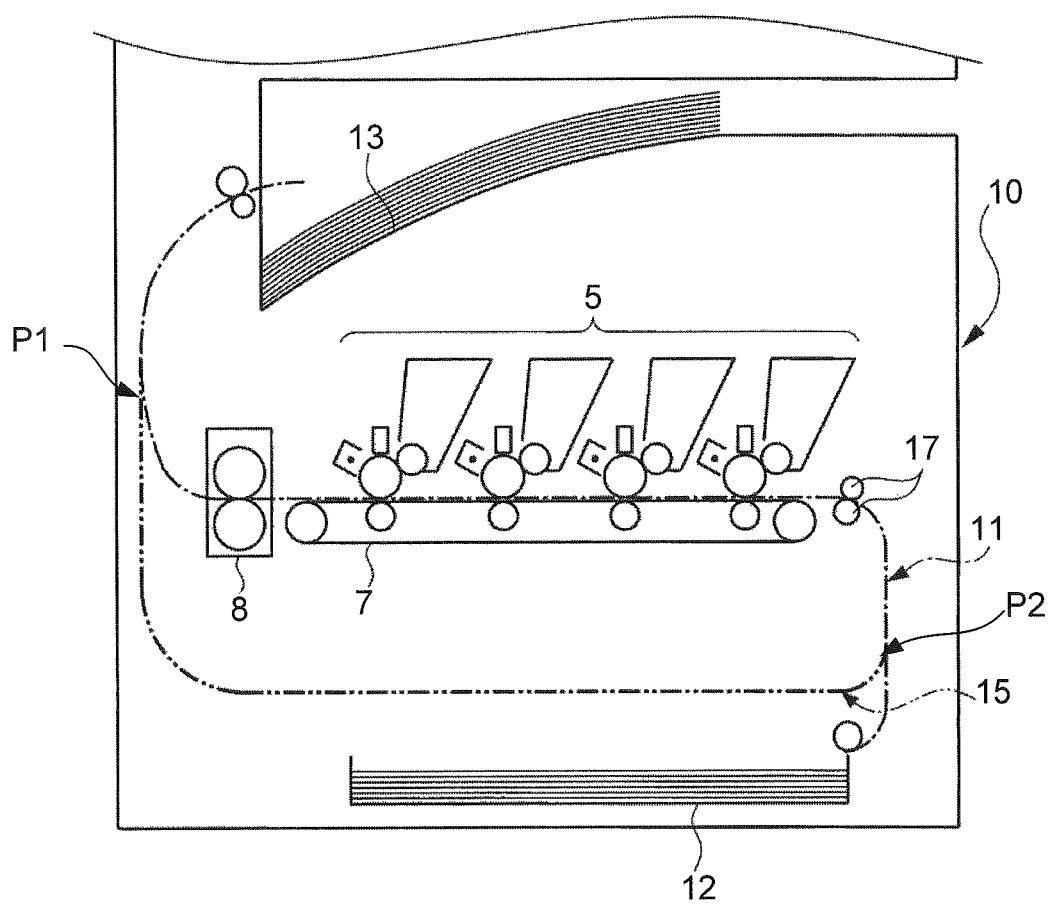
FIG. 2 is a sectional view of an illustrative image forming unit of the MFP.

As shown in FIG. 2, the image forming unit 10 may be an electrophotographic page printer capable of forming a color image. FIG. 2 is a sectional view of the image forming unit 10 taken along line A-A' of FIG. 1. FIG. 2 may show components of the image forming unit 10. The image forming unit 10 may comprise a image transfer assembly 5 configured to form a color toner image onto a sheet, a feeding belt 7 configured to feed the sheet to the image transfer assembly 5, and a fixing assembly (or fixing unit 8) configured to fix the toner image, which may be unfixed on the sheet, onto the sheet.

As shown in a dot-and-dash line in FIG. 2, the MFP 100 may have a feeding path 11 through which a sheet may be fed via the image transfer assembly 5. The MFP 100 may be configured to feed the sheet accommodated in the sheet supply tray 12 to the feeding path 11 when an image is formed. Further, the MFP 100 may be configured to form an image onto the fed sheet with the image transfer assembly 5 and the fixing unit 8. The MFP 100 may be configured to output or discharge a printed sheet to the output tray 13 with its printed side facing down. The sheet supply tray 12 may be an example of the accommodation portion.

The image forming unit 10 of the MFP 100 may be capable of performing double-sided printing. As shown in a two-dot chain line in FIG. 2, the MFP 100 has a return path 15, as a sheet feeding path for double-sided printing, that may branch off from the feeding path 11 and join the feeding path 11 again. The return path 15 may branch off from the feeding path 11 at a position P1 downstream of the fixing unit 8 and join the feeding path 11 1 at a position P2 upstream of the image transfer assembly 5 and downstream of the sheet supply tray 12, while bypassing the image transfer assembly 5.

When the double-sided printing is performed, the MFP 100 may be configured to print on one side of the sheet fed from the sheet supply tray 12 and to feed the sheet having an image printed on the one side of the sheet to the return path 15. In the return path 15, the sheet may be turned upside down. The sheet may be fed to an upstream side of the image transfer assembly 5 to print on the other side of the sheet. When two pages are printed in one sheet in the double-sided printing, the latter page may be printed first and the preceding page may be printed later, so that the preceding page may be face down when output.

A registration roller pair 17 may be disposed at a portion of a sheet feeding path downstream of a joint of the feeding path 11 and the return path 15 and upstream of the image transfer assembly 5. The registration roller pair 17 may comprise a pair of rollers configured to rotate and stop rotating. The MFP 100 may temporarily stop the sheet at the registration roller pair 17. In other words, the MFP 100 may stop the sheet fed from the feeding path 11 or the return path 15 at the registration roller pair 17 by stopping the rotation of the registration roller pair 17.

The image transfer assembly 5 of the MFP 100 may be configured to perform printing operation, for example, per sheet. In this case, the MFP 100 may rotate the stopped registration roller pair 17 in association with the timing of the image formation by the image transfer assembly 5, to feed the sheet, which stands by, to the image transfer assembly 5. After the MFP 100 starts feeding the sheet from the registration roller pair 17 to the image transfer assembly 5, the MFP 100 may feed the sheet until the printing operation is finished. Therefore, when there is no data to be printed by the image transfer assembly 5, the sheet started to be fed from the registration roller pair 17 may be output in blank without being printed. The registration roller pair 17 may be configured to feed the sheet to the image transfer assembly 5 and may be an example of a feeder.

As shown in FIG. 3, the image reading unit 20 may comprise an image sensor 22 configured to optically read an image, a contact glass 23, and the ADF 24. FIG. 3 is a sectional view of the image reading unit 20 taken along line B-B' of FIG. 1. FIG. 3 may show components of the image reading unit 20. The image sensor 22 may comprise optical elements arranged in line along a direction perpendicular to a sheet of FIG. 3. The image reading unit 20 may be configured to read an image on the document line by line while relatively moving the document and the image sensor 22 in a direction perpendicular to the arrangement direction of the optical elements. The image reading unit 20 may be configured to read an image in color or in monochrome.

The image reading unit 20 may be configured to perform reading using the ADF 24, and without using the ADF 24, e.g., using a flatbed (FB) contact glass 23. In the reading using the ADF 24, the image reading unit 20 may move the document placed on the document tray 26 with the ADF 24 to pass a portion opposing the image sensor 22 and may discharge the document to the discharge tray 27. In other words, in the reading using the ADF 24, the image reading unit 20 may read an image on the document with the image sensor 22 fixed while the document is moved.

In the reading using the flatbed contact glass 23, the image reading unit 20 may read an image on a document placed on the contact glass 23 by moving the image sensor 22 along the lower surface of the contact glass 23. In other words, in the reading using the flatbed contact glass 23, the image reading unit 20 may read an image on the document with the document fixed while the image sensor 22 is moved. The ADF 24 may be configured to open or close relative to the contact glass 23. When the ADF 24 is open, the ADF 24 may be away from the upper surface of the contact glass 23. When the ADF 24 is closed, the ADF 24 may cover the upper surface of the contact glass 23. In FIGS. 1 and 3, the ADF 24 may be closed. When the reading is performed using the flatbed contact glass 23, a user may open the ADF 24 to directly place the document on the contact glass 23.

As shown in FIG. 3, an interior of the ADF 24 may have a document feeding path 41 leading from the document tray 26 to the discharge tray 27. The ADF 24 may comprise an image sensor 42 that may be disposed in an interior of the ADF 24, in addition to the image sensor 22. The image sensor 42 may be disposed at position to read an image on a side of the document different from the side that the image sensor 22 may read. For example, in an example of FIG. 3, the image sensor 42 and the image sensor 22 may read the underside and upper sides of the document, respectively, when the document is placed on the document tray 26.

The MFP 100 may be configured to feed the document placed on the document tray 26 to the feeding path 41, in response to reception of a document reading instruction using the ADF 24. The document may be fed in the same feeding path 41 whether the single-sided reading or the double-sided reading is instructed. To read one side of the document using the ADF 24, the MFP 100 may use the image sensor 22. To read both sides of the document using the ADF 24, the MFP 100 may use the image sensor 22 and the image sensor 42 to read each side of the document while the document is fed once. The image sensor 22 and the image sensor 42 may be an example of a first reader and a second reader, respectively.

As shown in FIG. 3, the ADF 24 may comprise sensors 44, 45, and 46 configured to detect the presence or absence of the document at the respective detection positions. Each sensor 44, 45, and 46 may comprise a pivot member configured to move in association with the presence or absence of the document and a detection portion configured to output signals in association with the position of the pivot member. The detection portion may output ON and OFF signals when the pivot member is in a pivot position and a stop position, respectively. In other words, when there is a document at the detection position, the pivot member may pivotally move and the relevant sensor 44, 45, and 46 may be turned on. When a document is no longer detected at the detection position, the pivot member may return to its original position due to its weight or an urging force of, for example, a spring, and the relevant sensor 44, 45, and 46 may be turned off.

The sensor 44 may be configured to detect the presence or absence of the document placed on the document tray 26 of the ADF 24. When the control panel 40 receives a reading start instruction, and the MFP 100 determines that the document is placed on the ADF 24, based on the detection result of the sensor 44, the MFP 100 may perform the reading using the ADF 24. For example, when the sensor 44 of the ADF 24 is turned on, the MFP 100 may perform the reading using the ADF 24. When the sensor 44 is not turned on, the MFP 100 may perform the reading using the flatbed contact glass 23.

The sensor 45 may be configured to detect the presence or absence of the document in the feeding path 41 at a position upstream of the reading position of the image sensor 42. When the image sensor 42 reads an image on a document, the image reading unit 20 may determine reading start and reading end timings of the image sensor 42, based on the detection result of the sensor 45. The sensor 46 may be configured to detect the presence or absence of the document in the feeding path 41 at a position upstream of the reading position of the image sensor 22. The image reading unit 20 may determine the reading start and reading end timings of the image sensor 22, based on the detection result of the sensor 46.

Figure 4:
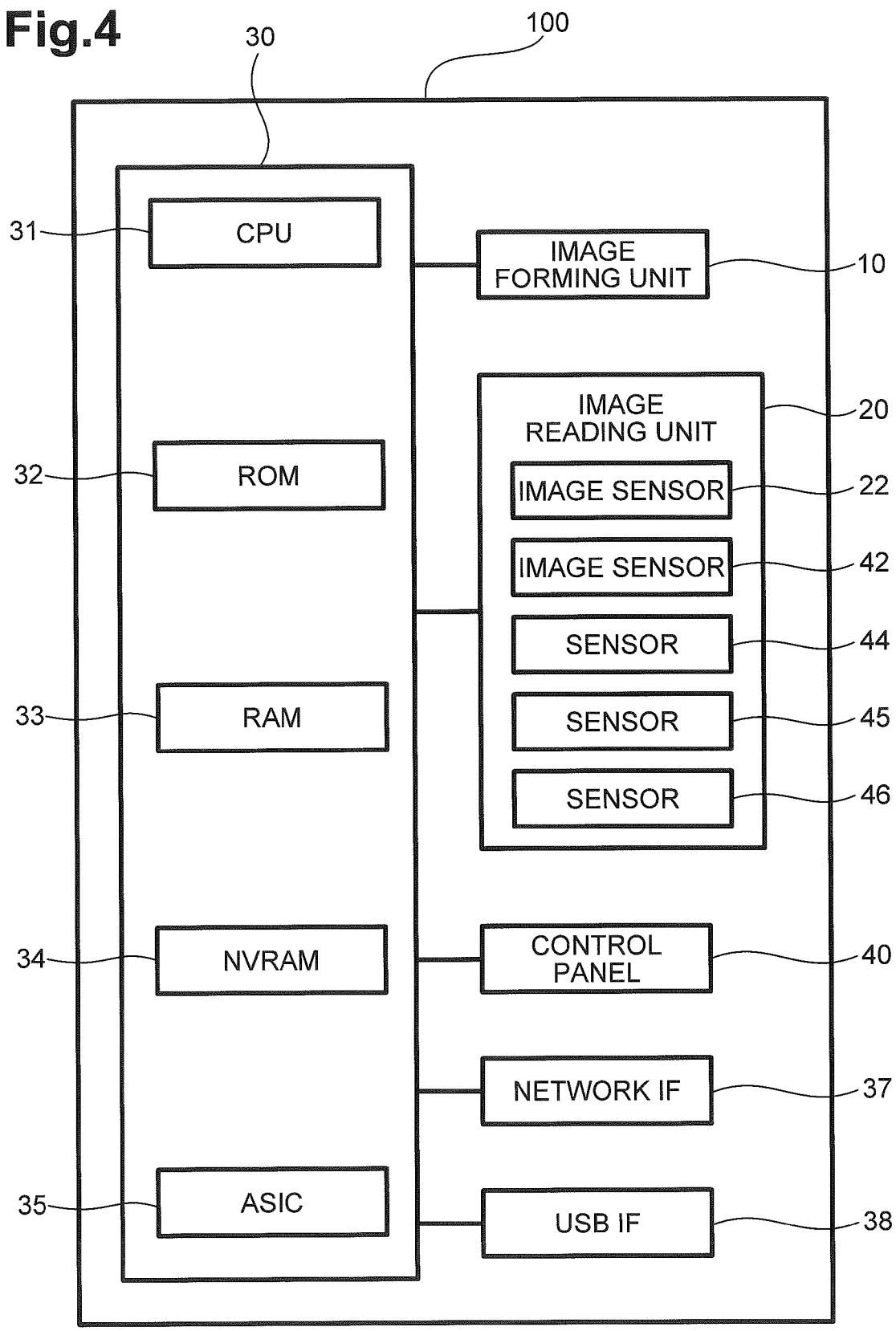
FIG. 4 is a block diagram showing an illustrative electrical configuration of the MFP.

Next, the electrical configuration of the MFP 100 will be described. As shown in FIG. 4, the MFP 100 may comprise a controller 30 comprising a central processing unit (CPU) 31, a read-only memory (ROM) 32, a random access memory (RAM) 33, a nonvolatile RAM (NVRAM) 34, and an application specific integrated circuit (ASIC) 35. The MFP 100 may comprise the image forming unit 10, the image reading unit 20, the control panel 40, a network interface 37, and a USB interface 38 that may be electrically connected to the controller 30.

The ROM 32 may store various control programs and various settings to control the MFP 100 and initial values. The RAM 33 may be used as a work area in which various control programs may be read out or a storage area in which data may be temporarily stored. The CPU 31 may be configured to control components of the MFP 100 by performing processing based on a control program read from the ROM 32 while storing processing results in the RAM 33 or the NVRAM 34. The CPU 31 may be an example of a processor. In another embodiment, the controller 30 or the ASIC 35 may function as a processor. The hardware, e.g., the CPU 31, used to control the MFP 100 may be collectively referred to as the controller 30 in the disclosure. The controller 30 might not be limited to a single hardware that may exist in the MFP 100.

The network interface 37 may be hardware to allow communication with a network via a local area network (LAN) cable. The USB interface 38 may be hardware to allow communication with devices connected via a universal serial bus (USB) cable.

Next, a blank page removal function of the MFP 100 will be described. The blank page removal function may be a function to restrict blank page output or discharge in printing. The MFP 100 may have a blank page removal function as one of its copy settings. The NVRAM 34 may store the setting to turn the blank page removal function on or off. For example, in the initial setting (e.g., default setting), the blank page removal function may be turned on. A setting of the blank page removal function may be received from a user, via the control panel 40 or the network interface 37. The NVRAM 34 may be an example of a storage device.

When the blank page removal function is set to on, the MFP 100 might not output the sheet if print data has no image. For example, when a document read by the image reading unit 20 in response to reception of a copying instruction is blank, the MFP 100 might not produce or output a copy of the blank document. When the blank page removal function is set to off, the MFP 100 may output a sheet with a copy of the document, in response to a reception of a copy instruction, regardless of whether the document is blank or not. In other words, when a blank document is copied, a blank sheet may be output to the discharge tray 27.

The MFP 100 may determine whether the document is blank, based on whether print data has an effective image. The effective image may be a toner image formed by, e.g., the image forming unit 10. To be considered as having an effective image, the document may be required, for example, to include a predetermined number of pixels or greater whose level of darkness may exceed a predetermined threshold. The MFP 100 may obtain the number of pixels whose level of darkness is greater than or equal to the predetermined threshold from data obtained by reading one line of an image. The MFP 100 may determine that the data contains an effective image to be printed when the number of such pixels is greater than a threshold value. The MFP 100 may determine that the data does not contain an effective image when the number of such pixels is less than or equal to the threshold value. The MFP 100 may concurrently perform determination of the presence or absence of an effective image and reading of an image on a document by the image reading unit 20.

In another embodiment, the MFP 100 may determine whether an effective image is contained in image data subjected to the image processing, e.g., specific color removal, noise removal, background color removal, and a seen-through-image removal (e.g., removal of image detected from the other side of a sheet). For example, when printing is performed based on such image processed data, the image processing may be performed for the read image, and the presence and absence of an effective image may be determined based on the processing result. The image processed data may be data to be used for printing by the image forming unit 10 and may be data used for exposure processing in an actual printing operation. In other words, in some cases, it may be determined that the image processed data does not contain an effective image even though the raw data (e.g., the data obtained from reading) would have been considered to have an effective image prior to undergoing image processing. Thus, an output of a blank sheet may be prevented or reduced. Even in this manner, the MFP 100 may make the determination of the presence or absence of an effective image concurrently with the document reading by the image reading unit 20. Still, in some embodiments, image processing may be performed and the determination of whether there is an effective image may be based on the raw data.

Next, a copying operation of the MFP 100 will be described. A copying operation may be an operation to print an image by the image forming unit 10 performed based on data of the image read by the image reading unit 20. The MFP 100 may be configured to select either one of the direct copying operation and the memory copying operation when a copy execution instruction is received. The MFP 100 may select which operation to use based on a default (or previously set) setting or a user input. In the direct copying operation, printing by the image forming unit 10 may be started before the reading of a document for one page is finished. In the memory copying operation, printing may be started after the reading of a document at least for one page is finished.

When the memory copying operation is performed, the MFP 100 may compress data of the read image and may store the compressed data in the RAM 33. In the memory copying operation, when the reading of a document for one page is finished, the whole image data for that page may be stored. Therefore, the memory copying may allow the MFP 100 to support copy instructions that may require processing of image data of a document, e.g., a reduced and enlarged copy, and a multiple-pages copy on one sheet. When such a copy instruction is provided to produce multiple copies, the MFP 100 may perform the memory copying operation, and use the image data stored for one reading operation multiple times. In other words, the MFP 100 may select the memory copying when the MFP 100 receives copy instructions that require processing of image data, e.g., scaling change, multiple pages per sheet, and multiple-copy production.

When the direct copying operation is performed, the MFP 100 may start printing before finishing the reading of a document, using a portion of the read image data. In the direct copying operation, the MFP 100 may perform a printing operation, concurrently with an image reading operation. Therefore, an outputted copy made according to the direct copying operation may be obtained faster than that made according to the memory copying operation. The MFP 100 might not compress image data when the direct copying operation is performed, to save time required to compress and decompress the image data. Due to memory capacity, data of an image that has been printed may be deleted in the direct copying operation. In other words, there may be a possibility that the image data for one page might not be stored when the document reading is finished in the direct copying operation. Therefore, when such a copy instruction is received that image data processing is not required and one copy is to be made, the MFP 100 may determine that requirements for the direct copying operation are satisfied and select the direct copying operation.

The document reading may be finished when the image reading unit 20 may finish reading the end of a reading area. In the reading using the flatbed contact glass 23, the document reading may be finished when the image sensor 22 may move to the end of the reading area of the document. In the reading using the ADF 24, the time when the reading is finished may be determined based on the time when it is detected that the sensor 46 is turned off. The image reading unit 20 may finish the document reading by the image sensor 22, for example, after a predetermined time elapsed since the document has passed the detection position of the sensor 46 and the sensor 46 has been turned off. In the disclosure, document reading might not comprise image processing for image data obtained by the image reading unit 20.

Figure 5:
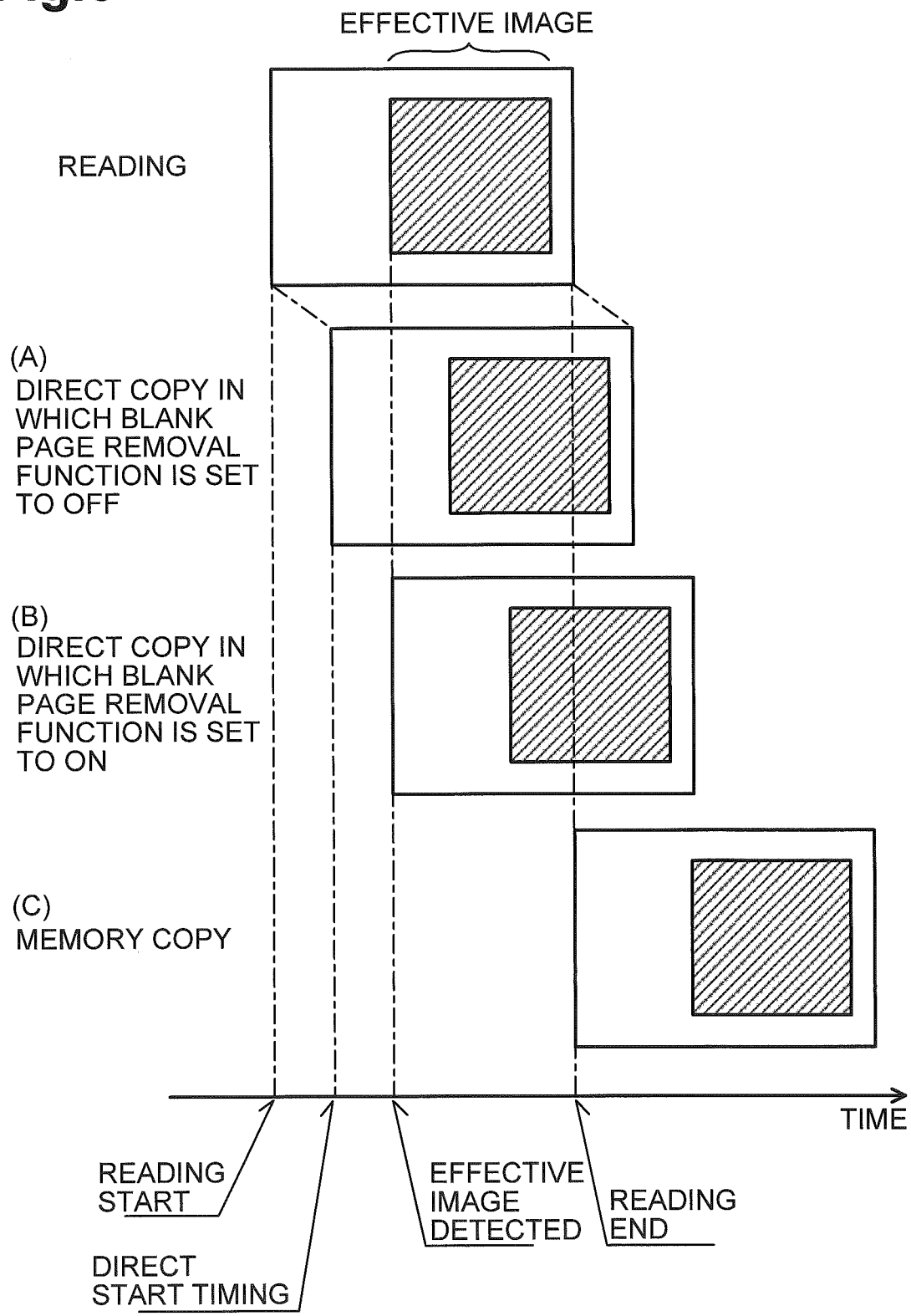
FIG. 5 is a diagram showing illustrative types of copying operations.

Next, a print start timing in a copying operation of the MFP 100 will be described. The MFP 100 may determine one print start timing from three modes (A)-(C), as shown in FIG. 5, according to settings of the device and details of the copy instruction. More specifically, mode (A) may perform the direct copying operation in which the blank page removal function is set to off; mode (B) may perform the direct copying in which the blank page removal function is set to on, and mode (C) may perform the memory copying. The topmost diagram in FIG. 5 may schematically illustrate a time interval from a time the reading starts to a time the reading ends and where on the document an effective image may be located.

The direct copying operation in which the blank page removal function is set to off in mode (A) may be selected when a copy instruction that may satisfy requirements for the direct copying operation is received and the blank page removal function is set to off. The MFP 100 may determine a print start timing in (A) as a direct start timing.

The direct-copying print start timing may be the earliest print start timing to finish the reading in time for printing before printing is finished. The MFP 100 may predict the document size (e.g., based on the size of the sheet used for printing), and the time when the document reading by the image reading unit 20 may finish. The MFP 100 may determine the direct start timing by making a back calculation based on the predicted document reading finish time. In other words, the printing operation start time may be calculated such that the trailing end of the sheet to be used for printing may pass the image transfer assembly 5 after the predicted document reading finish time and the calculated time may be determined as the direct start timing. The direct start timing may be a timing such that if printing is started at or after the direct start timing, a possibility or risk that data for printing may be unavailable (or not yet obtained) due to incomplete document reading may be reduced.

The MFP 100 may predict the document size, for example, based on the size of the sheet to be used for printing. In other words, the MFP 100 may predict the document size, assuming that the document size may be the same as the sheet size determined according to copy instructions or copy settings. In another embodiment, the length of the document may be predicted based on the width of the document, assuming that the document size is one of the standard sizes. In another embodiment, the MFP 100 may obtain the document size, based on, for example, detection results of the sensor 44.

In mode (A), an output of a blank sheet might not be restricted, and printing may be started at the direct start timing, which may be the earliest timing to start printing. In other words, in mode (A), the printing operation may be started at the direct start timing regardless of whether a document to be read is blank, so that the copying may finish early. In another embodiment, the direct start timing may be predetermined, not like the illustrative embodiment in which the direct start timing may be the calculated time based on predication, as described above. For example, the printing operation may be started after the document has been read by a predetermined number of lines.

The direct copying operation in which the blank page removal function is set to on in mode (B) may be selected when a copy instruction that may satisfy requirements for the direct copying operation is received and the blank page removal function is set to on. In mode (B), the MFP 100 may determine whether data obtained by reading a document by the direct start timing contains an effective image. Based on the result of determination whether the read data contains an effective image, it may be determined whether printing is started at the direct start timing. The direct-copying print start timing may be an example of a predetermined timing.

In mode (B) in the examples of FIG. 5, the data read by the direct start timing does not contain an effective image. In this case, the MFP 100 might not start feeding a sheet at the direct start timing. However, in other examples, even in mode (B), a sheet feeding may be started when the data read by the direct start timing contains an effective image. In other words, even in mode (B), printing on the sheet or feeding of the sheet may be started at the direct start timing, similar to mode (A), according to the position of an effective image.

When the data read by the direct start timing does not contain an effective image in mode (B), the MFP 100 may start feeding a sheet after an effective image is detected as shown in FIG. 5. When the data read by the direct start timing does not contain an effective image, it may be determined whether the read data contains an effective image at least once during the time after the direct start timing and before the document reading is finished. For example, it may be determined whether the read data contains an effective image every time one to a few lines are read after the direct start timing. When it may be determined that the data read by that time contains an effective image, the sheet feeding may be started. When the reading is finished with no effective image detected, the sheet feeding might not be started. Therefore, in mode (B), the sheet feeding may be started at the time when an effective image is first detected after the direct start timing. Therefore, when a document is blank, the sheet feeding might not be started, so that an output of a blank sheet may be reduced.

The memory copying operation may be selected when a copy instruction that might not satisfy requirements for the direct copying operation is received thereby placing the MFP in mode (C). In mode (C), the MFP 100 may start feeding a sheet after the reading for one page is finished, as shown in FIG. 5. For the memory copying operation, the MFP 100 may store the read data when reading is finished. Therefore, it may be determined whether the document is blank after the reading is finished.

For the memory copying, the blank page removal function setting and the read data may be checked after the reading is finished, and it may be determined whether a sheet feeding is started. In other words, in the memory copying operation, when it determined that the blank page removal function is set to on and the document is blank, the sheet feeding might not be started. When it determined that mode (C), e.g., the memory copying operation, is used for printing, the sheet feeding may be started at a memory copy timing. The memory copy timing may be later than the print start timings of modes (A) and (B). In other words, printing may be started at the earliest timing in mode (A), and printing may be started at the latest timing in mode (C). In mode (B), printing may be started at the same timing as that of mode (A) or later than that of mode (A) but earlier than that of mode (C).

A copy process in an example copying operation of the MFP 100 will be described referring to the flowchart of FIG. 6. The CPU 31 may execute the copy process in response to the reception of a copy execution instruction provided by operating a button on the control panel 40.

In the copy process, it may be first determined whether copy settings satisfy requirements for the direct copying operation (S101). The requirements for the direct copying operation may be satisfied when the MFP 100 receives a copy instruction to produce one copy that might not require the image data processing, as described above. In other words, when a copy instruction that requires the image data processing or a copy instruction to produce multiple copies is provided, the MFP 100 may determine that requirements for the direct copying operation are not satisfied in S101. When it is determined that requirements for the direct copying operation are not satisfied (S101: NO), the memory copying operation may be performed (S102). In S102, a known technique may be employed for the memory copying operation. After the MFP 100 finishes the memory copying operation, the copy process may end.

When it is determined that the requirements for the direct copying operation are satisfied (S101: YES), the MFP 100 may determine whether the document is placed in the ADF 24 (S103). The MFP 100 may determine whether the document is placed in the ADF 24, based on the detection result of the sensor 44. When it is determined that the document is not placed in the ADF 24 (S103: NO), the MFP 100 may perform the direct copying process using the flatbed contact glass 23 (S105).

Figure 7:
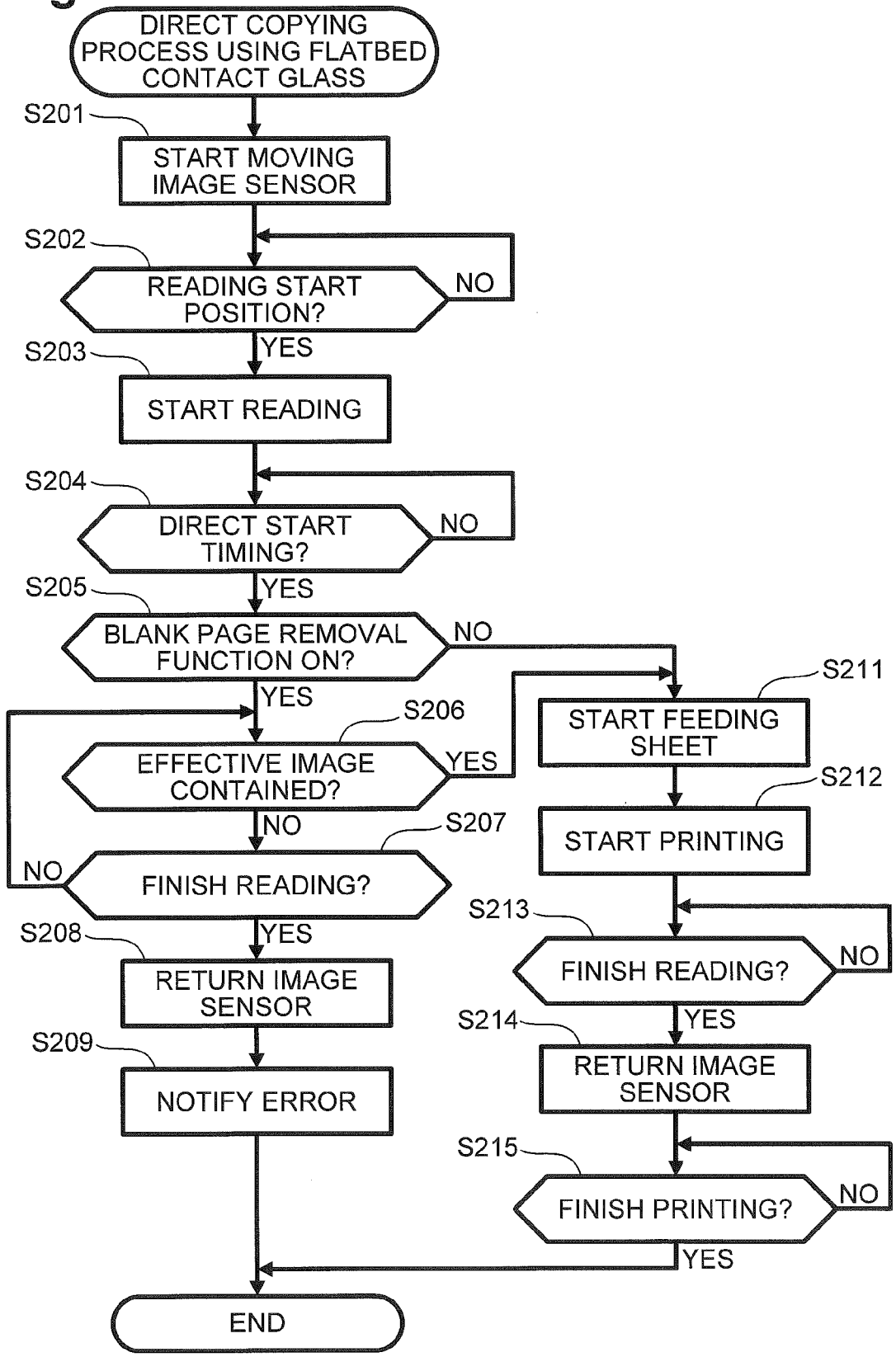
FIG. 7 is a flowchart showing an illustrative direct copying process using a flatbed glass.

An example direct copying process using the flatbed contact glass 23 in S105 will be described referring to the flowchart of FIG. 7. When the direct copying process using the flatbed contact glass 23 is started, the CPU 31 may first make the image reading unit 20 read an image on a document using the flatbed contact glass 23.

The CPU 31 may start moving the image sensor 22 along the lower surface of the contact glass 23 (S201). In the reading using the flatbed contact glass 23, the image reading unit 20 may read an image on the underside of the document placed on the contact glass 23 line by line by moving the image sensor 22. The image sensor 22 may stay or stop at a home position outside the reading area when document reading is not performed.

It may be determined whether the image sensor 22, which has started to move from the home position, has reached the reading start position (S202). When it is determined that the image sensor 22 does not reach the reading start position (S202: NO), the image sensor 22 may be further moved. When it is determined that the image sensor 22 reaches the reading start position (S202: YES), the document reading operation may be started (S203).

Thereafter, it may be determined whether the direct start timing has passed since the document reading is started in S203 (S204). When it is determined that the direct start timing has not yet passed (S204: NO), the MFP 100 may wait until the direct start timing comes.

When it is determined that the direct start timing has passed (S204: YES), it may be determined whether the blank page removal function is set to "on" (S205). When the MFP 100 determines that the blank page removal function is set to "on" (S205: YES), it may be determined whether image data read by that time contains an effective image (S206).

When it is determined that the image data contains no effective image (S206: NO), it may be determined whether reading of the sheet is finished (S207). The reading may finish as the image sensor 22 reaches the end of the reading area. When the reading is not finished (S207: NO), the process may again determine whether the image data contains an effective image (S206) and whether the reading of the sheet is finished (S207). Until the reading of the sheet is finished, it may be repeatedly determined whether the image data contains an effective image in S206 and whether the reading is finished in S207. The determination in S206 may be made for every one line read or after reading a predetermined number of lines (e.g., after reading 5 lines, 10 lines, etc.).

When the reading ends without detecting an effective image (S207: YES), it may be determined that the data contains no image to be printed, which may be caused by, for example, no document or a blank document placed on the contact glass 23. The image sensor 22 may be returned to the home position (S208), and an error may be displayed in the control panel 40 (S209). The error notification may include, for example, a message indicating that printing has not been performed due to a lack of an effective image, and the message may be displayed. The error notification may be made by outputting voice guidance in addition to, or instead of, by displaying a message. After S209, the direct copying process using the flatbed contact glass 23 may end. Thus, when the data contains no effective image, the sheet might not be fed. Therefore, such a possibility that a blank sheet is output may be low.

As an example cause of an error that no effective image is detected in the reading using the flatbed contact glass 23, the document might not be inserted completely in the ADF 24. In other words, a user may improperly place the document on the document tray 26 and might not insert the document to the detection position of the sensor 44. Thus, it may be determined that the document is not placed in the ADF 24 (S103: NO) in FIG. 6 and the reading using the flatbed contact glass 23 may be performed. In an error notification to be made in S209, a user may be notified of such a possibility that the document may be improperly set on the ADF 24. For example, a notification may indicate that the document needs to be fully inserted into the ADF 24. Thus, the user may be notified of the improper setting of the document.

When the blank page removal function is not set to "on" (S205: NO), or the image data contains an effective image (S206: YES) the printing operation may be started concurrently with the image reading operation. Accordingly, a sheet feeding may be started (S211). In other words, the registration roller pair 17 may be rotated to feed a sheet to the image transfer assembly 5. The sheet may be fed from the sheet supply tray 12 to the registration roller pair 17 before S211. Thus, printing may be started earlier, and consequently, the copying process may finish earlier. In other embodiments, the sheet starts to be fed from the sheet supply tray 12 in S211, and thus, the sheet might only be fed when it is certain that an image will be printed on the sheet. Therefore, the sheet might not be held in the MFP 100 at the registration roller pair 17 when it is not yet needed for printing an image.

The image forming unit 10 may start printing on the sheet that is fed in S211 (S212). Further, it may be determined whether the reading is finished (S213). When the reading is not finished (S213: NO), the MFP 100 may wait until the reading is finished. When the reading is finished (S213: YES), the image sensor 22 may be returned to the home position (S214).

Further, it may be determined whether printing is finished (S215). When the printing is not finished (S215: NO), the printing may be continued. When the printing is finished (S215: YES), the direct copying process using the flatbed contact glass 23 may end. Referring back to FIG. 6, the direct copying process using the flatbed contact glass 23 in S105 may end, and the copy process may end.

Figure 6:
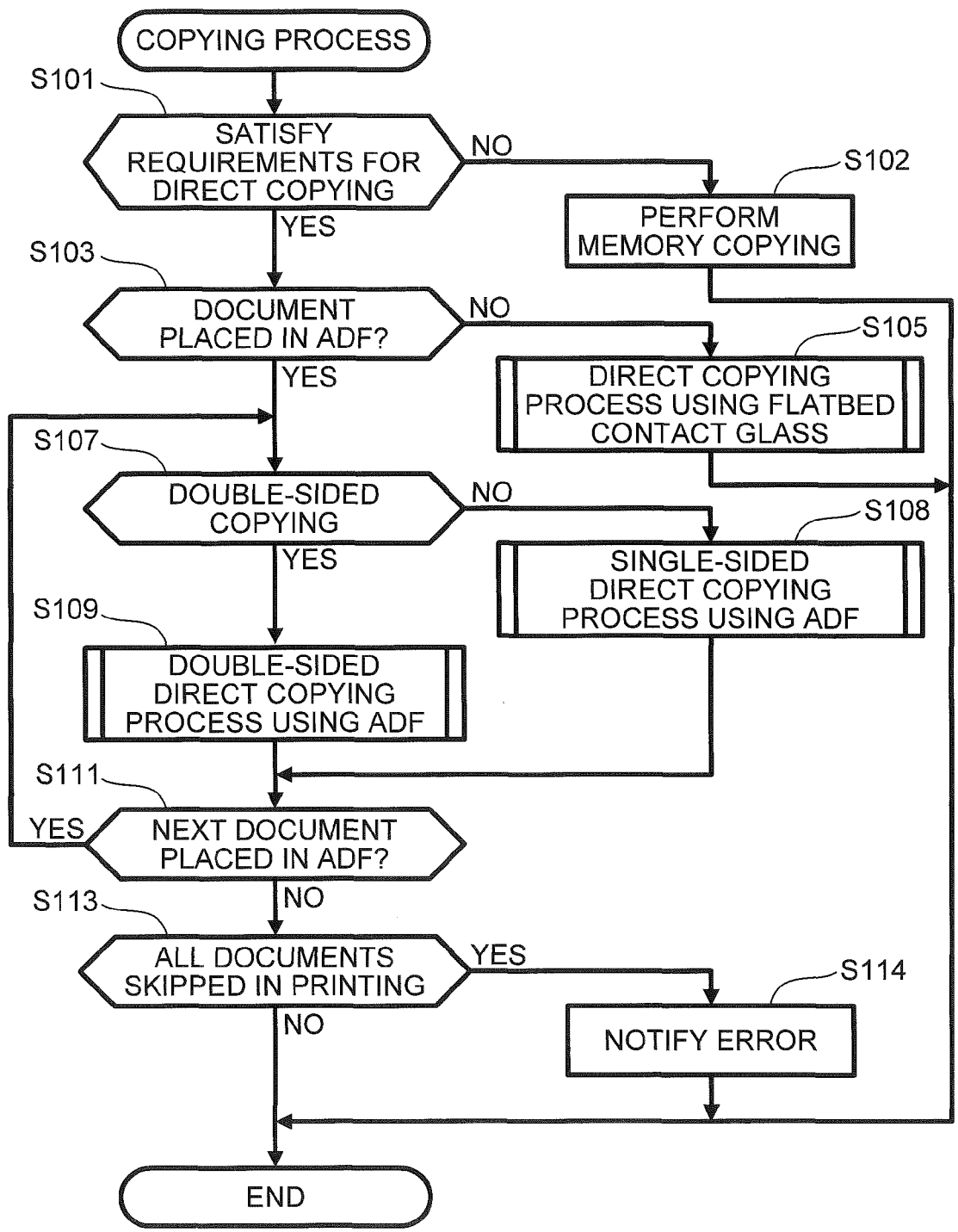
FIG. 6 is a flowchart showing an illustrative copy process.

In S103 of FIG. 6, when it is determined that the document is placed in the ADF 24 (S103: YES), a determination whether the double-sided copying is instructed may be performed (S107). As described above, the ADF 24 may comprise the image sensors 22 and 42. In the reading using the ADF 24, the single-sided reading may be performed differently from the double-sided reading. When it is determined that an instruction of the double-sided copying is not received but an instruction of the single-sided copy instruction is received (S107: NO), the single-sided direct copying process using the ADF 24 may be performed (S108).

Figure 8:
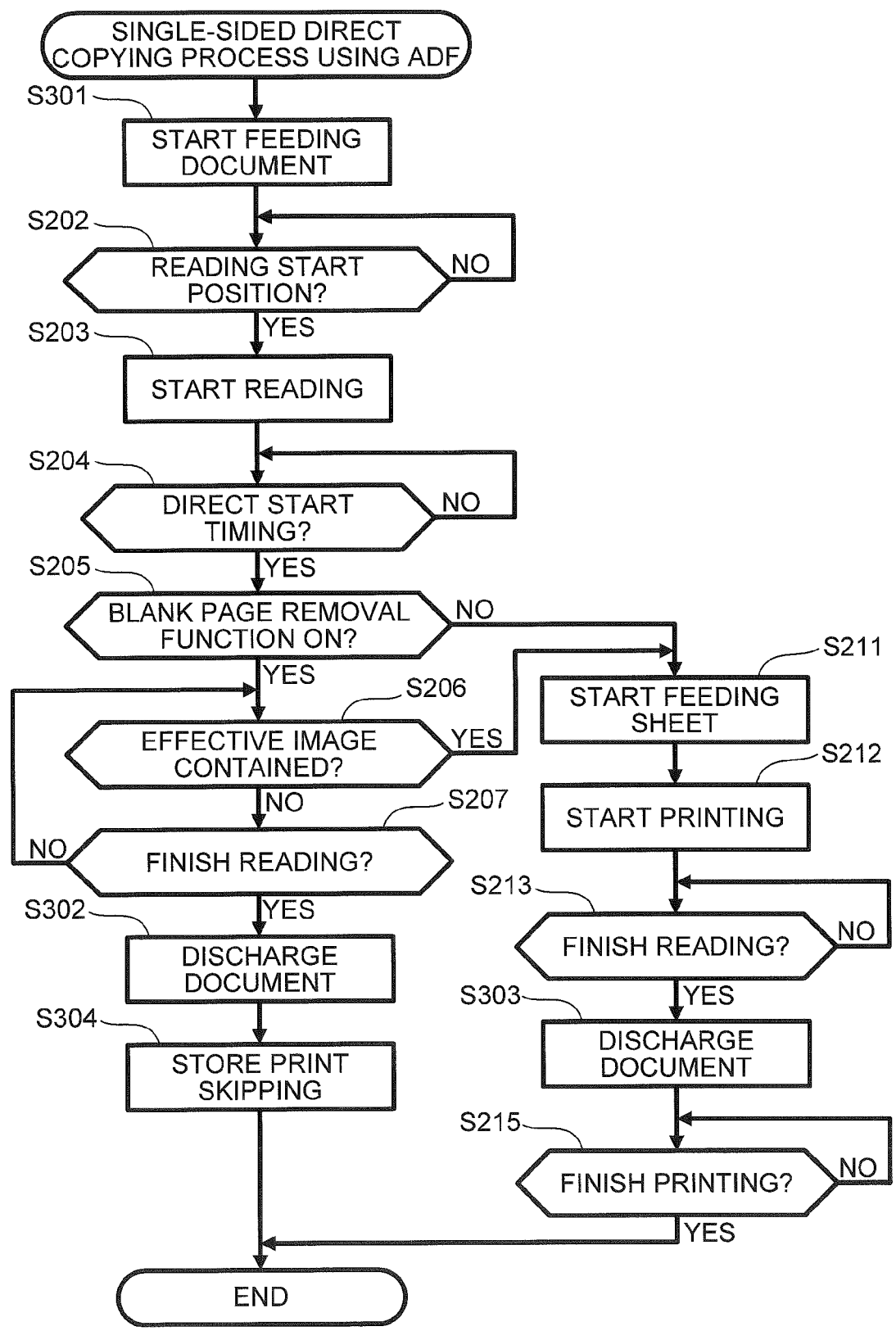
FIG. 8 is a flowchart showing an illustrative single-sided direct copying process using an auto-document feeder (ADF).

The single-sided direct copying process using the ADF 24 in S108 will be described referring to the flowchart of FIG. 8. In the single-sided direct copying process using the ADF 24, a document reading manner may be different from that in the direct copying process using the flatbed contact glass 23 in FIG. 7. Like reference numerals may be used for corresponding steps or processing in FIG. 8 and further description thereof with respect to FIG. 8 may be omitted herein.

When the single-sided direct copying process using the ADF 24 is started, the MFP 100 may make the image reading unit 20 read an image on a document using the ADF 24. Accordingly, the document feeding may be started in the ADF 24 (S301). More specifically, the topmost page of the document placed on the document tray 26 may be picked up into the ADF 24 and may be fed to a reading position for the reading using the ADF 24. The image sensor 22 may be moved from its home position to a reading position for the reading using the ADF 24. When each of the document and the image sensor 22 reaches the respective reading position, the determination in S202 may be YES and the reading may be started (S203). The MFP 100 may determine whether the document reaches the reading position, based on the detection result of the sensor 46.

Further, determinations in S204-S207 may be made similar to the direct copying process using the flatbed contact glass 23. When the document reading is finished with no effective image detected (S207: YES), the document whose image has been read may be discharged to the discharge tray 27 (S302). Further, it may be stored that printing of the document is skipped (S304). In the copy process using the ADF 24, when the blank page removal function is set to on and there is a blank document, the printing of the document may be skipped. After S304, the single-sided direct copying process using the ADF 24 may end.

When it is determined as NO in S205 or YES in S206, the printing may be performed similar to the direct copying process using the flatbed contact glass 23 (S211-S213). When the document reading is finished (S213: YES), the document whose image has been read may be discharged to the discharge tray 27 (S303). It may be determined whether printing is finished (S215). When the printing is not finished (S215: NO), the printing may be continued. When the printing is finished (S215: YES), the single-sided direct copying process using the ADF 24 may end.

Referring back to FIG. 6, after the single-sided direct copying process using the ADF 24 in S108, it may be determined whether a next document remains in the ADF 24 (S111). The MFP 100 may determine whether another document (e.g., a second sheet) remains in the ADF 24 based on a detection result of the sensor 44. When a next document does not remain in the ADF 24 (S111: NO), the copy process may end. For example, when it is determined that the next document does not remain in the ADF 24 based on the detection result of the sensor 44, the image sensor 22 may be returned to its home position. When the next document remains in the ADF 24 (S111: YES), flow may return to S107 in which it may be determined again whether an instruction of the double-sided copying is received.

In S107 of FIG. 6, when it is determined that an instruction of the double-sided copying is received (S107: YES), the double-sided direct copying process using the ADF 24 may be performed (S109).

Next, the double-sided direct copying process using the ADF 24 in S109 will be described referring to the flowchart of FIG. 9. In the double-sided direct copying process using the ADF 24, a document reading manner may differ from those of the direct copying process using the flatbed contact glass 23 in FIG. 7 and the single-sided direct copying process using the ADF 24 in FIG. 8. Like reference numerals may be used for like corresponding steps or processing in FIG. 9 and further description thereof with respect to FIG. 9 may be omitted herein.

When the double-sided direct copying process using the ADF 24 is started, the MFP 100 may start feeding the document in the ADF 24 (S301). Each of the image sensor 22 and the image sensor 42 may read a different side of the document. More specifically, the image sensor 42 may read an image on the back side of the document and the image sensor 22 may read an image on the front side of the document. The front side of the document may be an upper surface of the document, e.g., a surface facing upward, when the document is placed on the document tray 26 (refer to FIG. 3). The MFP 100 may first start reading an image on the back side of the document and then an image on the front side of the document, due to the arrangement of the image sensors 22 and 42 in the feeding path 41.

The MFP 100 may first determine whether a leading end portion of the document reaches the reading start position of the image sensor 42 (S401). The MFP 100 may determine the position of the leading end of the document, based on the timing when the sensor 45 disposed upstream of the image sensor 42 is turned on from the off state. In other words, the MFP 100 may determine whether the document reaches the reading start position of the image sensor 42, based on the detection result of the sensor 45. When it is determined that the document does not reach the reading start position of the image sensor 42 (S401: NO), the document may further be fed. When it is determined that the document reaches the reading start position of the image sensor 42 (S401: YES), the image sensor 42 may start reading the back side of the document, based on the time when the document reaches the reading start position of the image sensor 42 (S402).

Further, it may be determined, concurrently with the reading of the back side of the document by the image sensor 42, whether the document reaches the reading start position of the image sensor 22, based on the detection result of the sensor 46 (S403). When it is determined that the document does not reach the start position of the image sensor 22 to read the front side of the document (S403: NO), the reading of the back side of the document and feeding of the document may be continued. When it is determined that the document reaches the reading start position of the image sensor 22 to read the front side of the document (S403: YES), the image sensor 22 may start reading an image on the front side of the document, based on the time when the document reaches the reading start position of the image sensor 22 (S404).

Thereafter, it is determined whether the direct start timing has come (S204). More specifically, it may be determined whether the direct start timing for a first printing side has come. The first printing side may be a page that is printed first on one side of the sheet when the double-side printing is performed. The MFP 100 may be configured to perform printing first based on the image on the back side of the document. In S204, the direct start timing may be calculated based on the reading start time of the image sensor 42, as described above. Further, it may be determined whether the calculated direct-copying print start timing has come. The order of printing the first printing side and the latter printing side might not correspond to the order of reading those sides. The relation of the orders of printing and reading sides of a document may differ according to the structure of image forming apparatuses or copy settings.

Further, determinations in S205-S206 may be made in a manner similar to that used in the single-sided direct copying process using the ADF 24. In S206, when the data of at least one side of the document contains an effective image, it may be determined that the data contains an effective image. When it is determined as NO in S205 or as YES in S206, the double-sided direct printing process may be performed (S407). In other words, the printing of at least one side of the document may be performed when the blank page removal function is set to off or an effective image has been detected on either side of the document at the direct start timing of the first printing side.

When no effective image has been detected on either side of the document at the direct start timing of the first printing side (S206: NO), the document reading for each side of the document may further be continued. When the document reading for each side of the document is finished with no effective image contained in the data for each side of the document (S207: YES), the document that was read may be discharged, and it may be stored that printing of the document is skipped (S304). Then, the double-sided direct copying process using the ADF 24 may end. In S207 of the double-sided direct copying process using the ADF 24, it may be determined that the reading is finished when the document passes both image sensors 42 and 22. This determination may be made using information detected by sensor 46.

When it is determined that data of either side of the document contains an effective image (S206: YES), the double-sided direct copying process may proceed to S407 in which the double-sided direct printing process may be performed. Next, the double-sided direct printing process in S407 will be described, referring to the flowchart of FIG. 10.

In the double-sided direct printing process, the MFP 100 may first supply a sheet from the sheet supply tray 12 and feed the sheet to the registration roller pair 17 (S501). Execution of printing onto at least one side of the sheet may be determined at the time when the double-sided direct printing process is started. Therefore, the sheet may be fed from the sheet supply tray 12 to the registration roller pair 17.

Then, it may be determined whether the data of the first printing side contains an effective image (S502). When the data of the first printing side read by that time does not contain an effective image (S502: NO), it may be determined whether the reading of the first printing side is finished (S504). When the reading of the first printing side is not finished (S504: NO), the reading may be continued.

When it is determined that the data of the first printing side contains an effective image (S502: YES), the printing of the first printing side may be started (S506). Accordingly, the sheet feeding toward the image transfer assembly 5 may be started by rotating the registration roller pair 17. The sheet has been already fed to the registration roller pair 17 in S501. Therefore, the printing may be started earlier.

Further, it may be determined whether printing of the first printing side is finished (S507). When the printing is not finished (S507: NO), the printing may be continued. When the printing of the first printing side is finished (S507: YES), the sheet may be fed to the registration roller pair 17 through the return path 15 to turn the sheet upside down (S508). Then, the printing of the second printing side may be started (S510).

When the reading of the first printing side is finished with no effective image contained in the data of the first printing side (S504: YES), the printing of the second printing side may be started without turning the sheet upside down (S510). In the MFP 100, the direct start timing for the second printing side may have already passed at the time when the document reading of the first printing side is finished. Accordingly, printing may be started promptly. If the reading of the first printing side may finish earlier than the direct start timing for the second printing side, the printing of the second printing side may be started after the direct start timing for the second printing side has come.

Further, it may be determined whether the printing of the second printing side is finished (S512). When the printing is not finished (S512: NO), the printing may be continued. When the printing of the second printing side is finished (S512: YES), the double-sided direct printing process may end.

Figure 9:
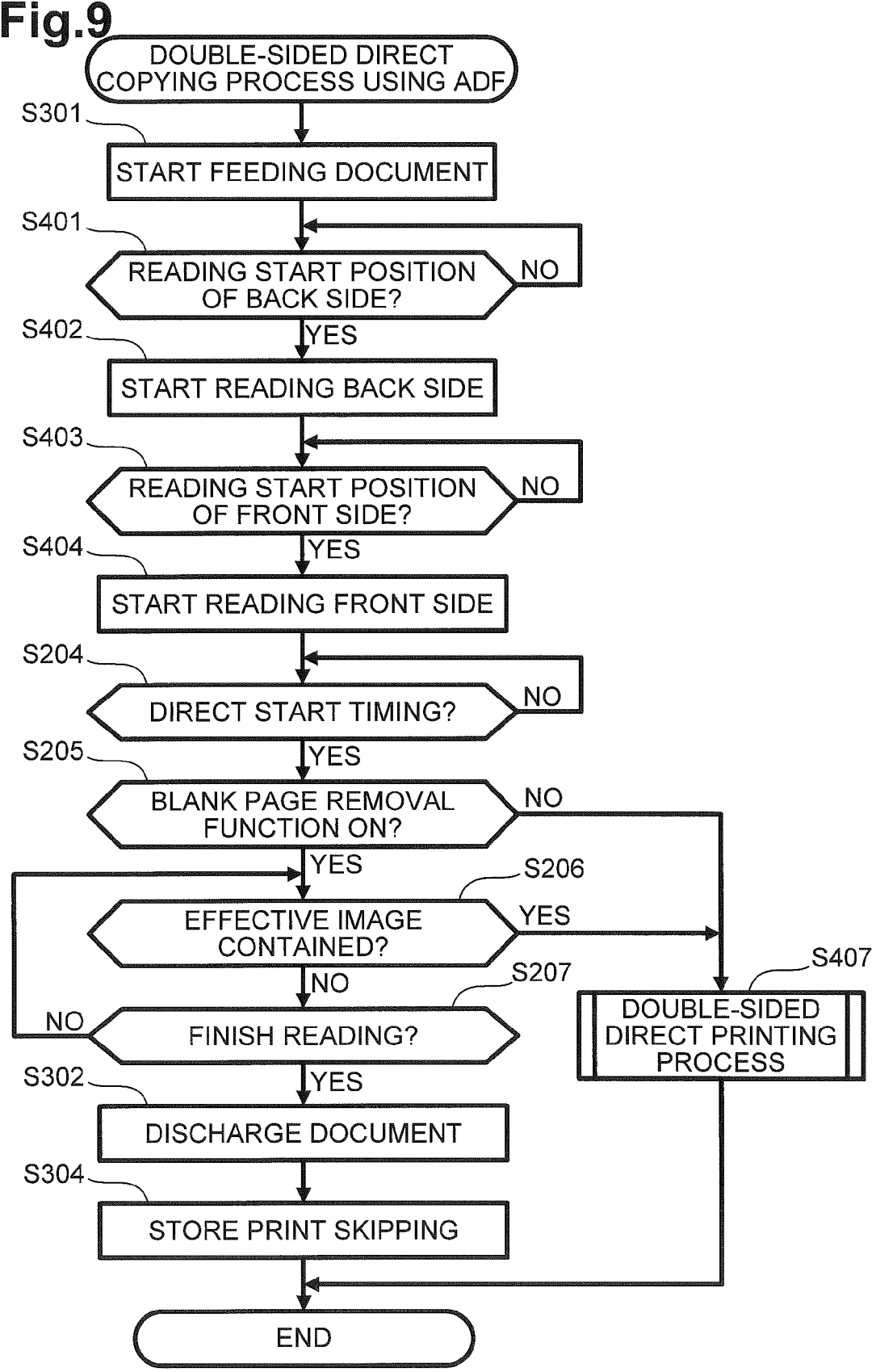
FIG. 9 is a flowchart showing an illustrative double-sided direct copying process using the ADF.
Figure 10:
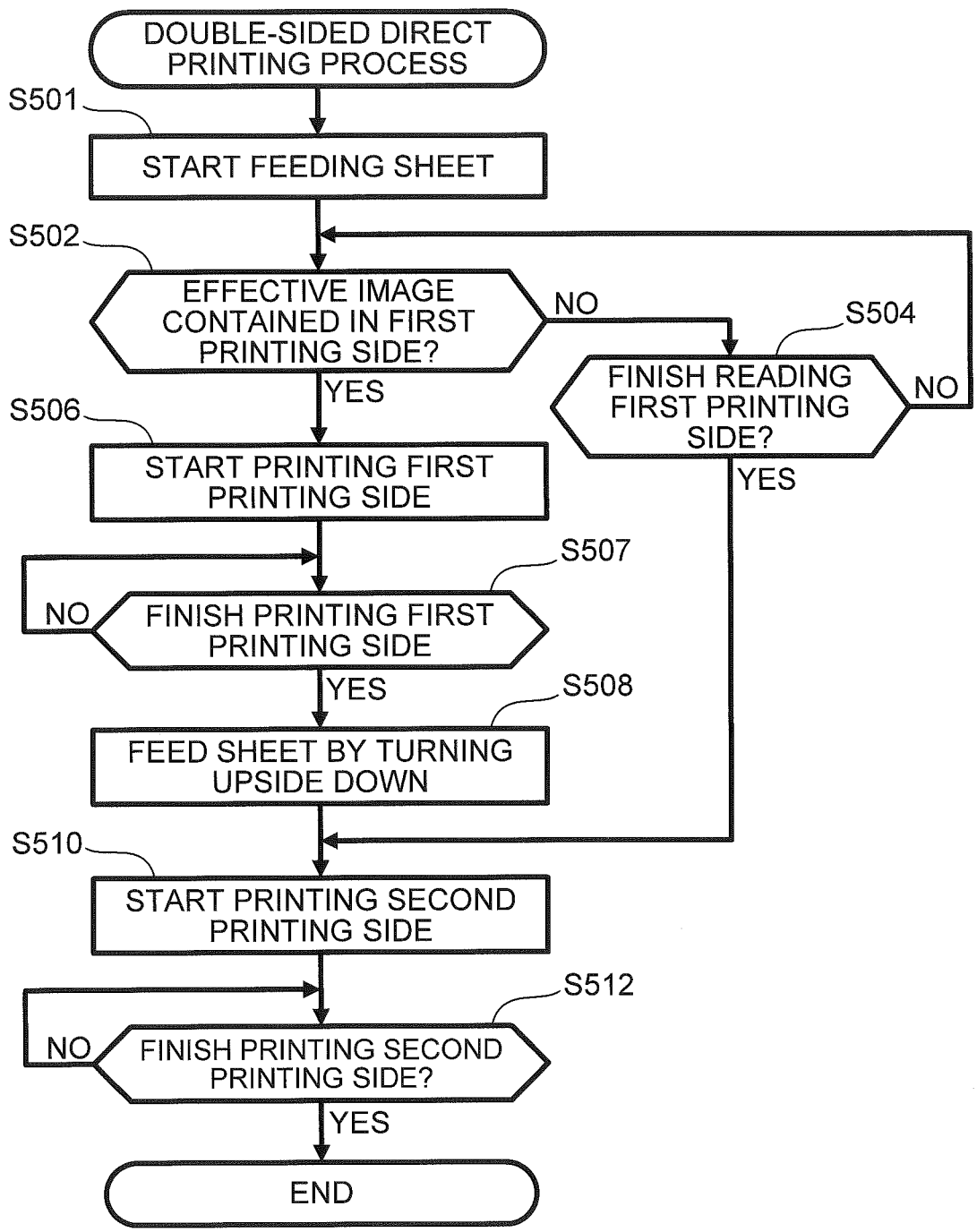
FIG. 10 is a flowchart showing an illustrative double-sided direct printing process.

The double-sided direct printing process may be started in FIG. 10, after it is determined as YES in S204 of FIG. 9, e.g., after the direct start timing for the first printing side has come. In the double-sided direct printing process, the printing of the first printing side may be started at the direct start timing for the first printing side, if the data of the first printing side contains an effective image. When the data of the first printing side does not contain an effective image at the direct start timing for the first printing side, the printing of the first printing side may be started by waiting for an effective image to be detected in the data of the first printing side. The printing of the first printing side might not be performed when an effective image is not detected in the data by the time when the reading of the first printing side is finished.

When the double-sided direct printing process in FIG. 10 is started by being determined as NO in S205 of FIG. 9, the blank page removal function may be set to off. In this case, it might not have to be checked whether the read data contains an effective image. For example, the printing in S506 may be started without the determination in S502 of FIG. 10 or it may be determined whether the printing of the first printing side is performed based on the determination as to whether the data of the first printing side contains an effective image. Regardless of whether the first printing side is printed, the printing of the second printing side may be started at the direct start timing for the second printing side. In other words, when the data of the first printing side does not contain an effective image, a sheet might not be turned upside down. Thus, the copying may be finished earlier without restricting a blank sheet output.

When the double-sided direct printing process in FIG. 10 is started by being determined as YES in S206 of FIG. 9, the blank page removal function may be set to "on" and data of at least one side of the document may contain an effective image. Therefore, the printing of the first printing side and the second printing side may be started as early as possible at or after their respective direct start timing, so that the copying may be finished earlier while a blank sheet output is prevented or reduced. In other words, the sheet feeding to the image transfer assembly 5 may be started promptly in S510 of FIG. 10 if the direct start timing for the second printing side has already come.

After the double-sided direct printing process in S407 of FIG. 9, the double-sided direct copying process using the ADF 24 may end. After the double-sided direct copying process using the ADF 24 in S109 of FIG. 6, it may be determined whether the next document remains in the ADF 24 (S111). When the next document remains in the ADF 24 (S111: YES), the process may return to S107, in which it may be determined again whether an instruction of the double-sided copying is received.

When the next document does not remain in the ADF 24 (S111: NO), it may be determined whether all documents are skipped in printing (S113). When the blank page removal function is set to on, and a document is blank, it may be stored that the page is skipped in printing in S304 in FIGS. 8 and 9. When all documents placed in the ADF 24 are blank, all blank documents might be skipped in printing. When it is determined that all documents are not skipped in printing (S113: NO), the copy process may end.

When it is determined that all documents are skipped in printing (S113: YES), an error may be notified (S114). For example, it may be notified that all documents read by the ADF 24 are blank. For example, the confirmation of the document may be notified. When the single-sided reading is instructed, the confirmation of the front and back sides of the document may be notified. Then, the copy process may end. It may be stored that the document is skipped in printing in S304. In another embodiment, it may be stored that printing is performed, as long as it may be determined whether all documents are skipped in printing in S113.

As described above, after the reading of an image on a document is started in the image reading unit 20, it may be determined at the direct start timing whether the read data contains an effective image to be printed. When it is determined that the read data contains an effective image, a sheet feeding may be started from the registration roller pair 17 to the image transfer assembly 5. When it is determined that the read data does not contain an effective image, a sheet feeding might not be started. In other words, when the read data contains an effective image, a sheet feeding may be started at the direct start timing at which the direct copying may be started. Therefore, when the read data contains an effective image, the printing may be started earlier. When the read image does not contain an effective image, a blank sheet output may be reduced.

While the disclosure has been described in detail with reference to specific embodiments thereof, these are merely examples, and various changes, arrangements and modifications may be applied therein without departing from the spirit and scope of the disclosure. For example, the disclosure may be applied to devices other than the MFP 100, such as copiers or facsimile machines having the image reading function and the image forming function. Also, some steps of the processes disclosed herein may be re-ordered or performed simultaneously. For example, the determination of whether an effective image is included within the read data may be performed prior to or at the same time as determining whether the direct start timing has been reached.

For example, as described above, when the blank page removal function is set to "on," it may be repeatedly determined whether read data contains an effective image until the reading is finished (S206). In another embodiment, the memory copying process may be selected without repeating the determination in S203, when the data does not contain an effective image at the direct start timing. Thus, the control may become simpler. If the determination is repeated in S206, the direct copying operation may be started at the time when an effective image is detected. Therefore, the possibility that the copying may finish earlier may be high.

Further, in some embodiments, for example, it may be determined that read data includes an effective image when the read data includes a single pixel with a predetermined density or greater. This determination may be easier and the control may become simpler.

In another embodiment, for example, the blank page removal function setting may be omitted. In other words, the blank page removal function may always be turned on. More specifically, the blank page removal may be performed for every copying operation, so that determination in S205 of FIGS. 7, 8, and 9 may be omitted and the process may proceed to S206 in case of "YES" in S204.

In another embodiment, for example, when the single-sided copy instruction is provided and the document reading is performed using the ADF 24, the MFP 100 may perform the direct copying operation without determining whether the read data contains an effective image. In other words, S211 may be performed after S204, and S205-S207, S302 and S304 may be omitted in FIG. 8. When a single-sided copy instruction is provided and the reading is performed using the ADF 24, such a possibility that the document is blank may be low. Therefore, a priority may be placed on an early copy finish.

As described above, in the double-sided direct copying process using the ADF 24 as shown in FIG. 9, it may be determined whether the direct start timing has come (S204) before the reading of the back side of the document is started (S402) and the reading of the front side of the document is started (S404). In another embodiment, it may be determined whether the direct start timing has come after the reading of at least one side of a document is started. For example, determination in S204-S206 may be made between S402 and S403. In this case, the printing of the back side of the document may be started first when the read data for the back side of the document contains an effective image at the direct start timing for the back side of the document before the reading of the front side of the document is started.

As described above, in the reading using the ADF 24, the sensor 44 may be configured to directly detect the presence or absence of the document placed on the document tray 26. In another embodiment, for example, when a reading start instruction is received, feeding rollers of the ADF 24 may first be driven to pull a potential sheet from the document tray 26, and then it may be determined whether a document is placed in the ADF 24 when a sensor is turned on after a predetermined period of time.

For example, an instruction of the double-sided copying may be received for the reading using the flatbed contact glass 23. For example, for an instruction of the double-sided copying, a notice, after one side of a document is read, that the other side of the document is to be set and the start button is to be pressed may be output. When the pressing of the start button is received, the image sensor 22 may be moved again to perform the reading using the flatbed contact glass 23. As to the printing of the other side, it may be determined whether the direct copying is performed, based on the blank page removal function setting or copy settings.

For example, when only data of the first printing side contains an effective image, the sheet may be output without feeding the sheet to the return path 15 even when the double-sided copy is instructed.

For example, components shown in FIGS. 1-3 are merely examples and may be replaced with various known components. For example, the disclosure might not be limited to page printers, but may be inkjet printers or line printers. For example, the disclosure might not be limited to an image forming apparatus comprising two image sensors but may be applied to an apparatus configured to read each side of the document by turning the document upside down in an ADF and feeding the document.

As described above, a single CPU may perform all of the processes. Nevertheless, the disclosure is not limited in this regard, and a plurality of CPUs, a special application specific integrated circuit ("ASIC"), or a combination of a CPU and an ASIC may be used to perform the processes. Processes or processing disclosed in the illustrative embodiments may be realized by various manners, e.g., by one or more storage media storing programs for executing the processes or processing or a method for executing the processes or processing.

What is claimed is:

1. An image forming apparatus, comprising:
   a scanner configured to read a document page;
   a feeder configured to feed a sheet;
   a printer configured to print an image on the sheet;
   at least one processor;
   a storage device configured to store a setting indicating whether a blank page removal function is on or off; and
   memory storing computer-executable instructions that, when executed by the at least one processor, cause the image forming apparatus to:
   control the scanner to read the document page to generate read data;
   determine whether the read data provides the image while the scanner is reading the document page when the blank page removal function is on;
   prior to completely reading the document page, control the feeder to start feeding the sheet to the printer upon determining that the read data provides the image; and
   control the printer to start printing the image of the document page on the sheet, which the feeder starts feeding, in response to determining that the read data, which corresponds to the document page, provides the image.

2. The image forming apparatus of claim 1, wherein the computer-executable instructions, when executed by the at least one processor, cause the image forming apparatus to:
determine whether the read data provides the image by determining whether a substantially blank sheet would be printed based on the read data.

3. The image forming apparatus of claim 1, wherein the computer-executable instructions, when executed by the at least one processor, cause the image forming apparatus to:
determine that the read data provides the image if the read data represents a predetermined number of pixels or greater each having a level of darkness that exceeds a predetermined threshold.

4. The image forming apparatus of claim 1, wherein the computer-executable instructions, when executed by the at least one processor, cause the image forming apparatus to:
in response to determining that the read data provides the image, control the printer to start printing the image on the sheet while the scanner reads the document page.

5. The image forming apparatus of claim 1, wherein the computer-executable instructions, when executed by the at least one processor, cause the image forming apparatus to:
again determine whether the read data provides an image before the scanner finishes reading the document page in response to determining that the read data does not provide an image.

6. The image forming apparatus according to claim 1, further comprising an accommodation portion configured to accommodate one or more sheets,
wherein the computer-executable instructions, when executed by the at least one processor, further cause the image forming apparatus to supply the sheet from the accommodation portion in response to determining that the read data provides the image.

7. The image forming apparatus according to claim 1, wherein the scanner comprises:
a first scanner configured to read one side of the document page to generate first read data; and
a second scanner configured to read another side of the document page to generate second read data,
wherein the computer-executable instructions, when executed by the at least one processor, cause the image forming apparatus to control the feeder to start feeding the sheet to the printer in response to determining that the first read data or the second read data provides the image.

8. The image forming apparatus according to claim 1, wherein the computer-executable instructions, when executed by the at least one processor, further cause the image forming apparatus to provide notification of an error in response to determining that the read data does not provide an image after the scanner finishes reading the document page.

9. The image forming apparatus according to claim 1, further comprising:
a document tray configured to hold the document page to be read by the scanner; and
a document feeder configured to feed the document page from the document tray to the scanner,
wherein the scanner comprises an image sensor configured to read a document placed on a glass surface, and
wherein the computer-executable instructions, when executed by the at least one processor, further cause the image forming apparatus to provide a notification indicating that the document page was not properly placed in the document tray in response to determining that the read data does not provide an image after the image sensor scans the glass surface.

10. A method, comprising:
reading a document page to generate read data;
determining, by a controller, whether the read data provides an image while a scanner reads the document page when a setting, stored in a storage device, indicates that a blank page removal function is on;
prior to completely reading the document page, initiating feeding of a sheet to a printer to print the image upon to determining that the read data provides the image; and
controlling the printer to start printing the image of the document page on the sheet, which a feeder starts feeding, in response to determining that the read data, which corresponds to the document page, provides the image.

11. The method of claim 10, wherein determining whether the read data provides the image comprises determining whether a substantially blank sheet would be printed based on the read data.

12. The method of claim 10, wherein determining whether the read data provides the image comprises determining that the read data provides the image if the read data represents a predetermined number of pixels or greater each having a level of darkness that exceeds a predetermined threshold.

13. The method of claim 10, wherein controlling the printer comprises controlling the printer to start printing the image on the sheet while the scanner reads the document page.

14. The method of claim 10, further comprising again determining, by the controller, whether the read data provides an image while reading the document page in response to determining that the read data does not provide an image.

15. One or more non-transitory computer-readable media storing computer-executable instructions that, when executed by at least one processor, cause an apparatus to:
control a scanner to read a document page to generate read data;
determine whether the read data provides an image while the scanner reads the document page when a setting, stored in a storage device, indicates that a blank page removal function is on;
prior to completely reading the document page, initiate feeding of a sheet to a printer to print the image upon to determining that the read data provides the image; and
control the printer to start printing the image of the document page on the sheet, which a feeder starts feeding, in response to determining that the read data, which corresponds to the document page, provides the image.

16. The one or more non-transitory computer-readable media of claim 15, wherein the computer-executable instructions, when executed by the at least one processor, cause the apparatus to:
determine whether the read data provides the image by determining whether a substantially blank sheet would be printed based on the read data.

17. The one or more non-transitory computer-readable media of claim 15, wherein the computer-executable instructions, when executed by the at least one processor, cause the apparatus to:
determine that the read data provides the image if the read data represents a predetermined number of pixels or greater each having a level of darkness that exceeds a predetermined threshold.

18. The one or more non-transitory computer-readable media of claim 15, wherein the computer-executable instructions, when executed by the at least one processor, cause the apparatus to:

in response to determining that the read data provides the image, control the printer to start printing the image on the sheet while the document page is being read.

19. The one or more non-transitory computer-readable media of claim 15, wherein the computer-executable instructions, when executed by the at least one processor, further cause the apparatus to:

repeatedly determine whether the read data provides an image as long as the document page is being read but until determining that the read data provides an image.

* * * * *